United States Patent Office 3,471,545
Patented Oct. 7, 1969

3,471,545
CATALYTIC PROCESS FOR THE PREPARATION OF ACRYLONITRILE OR METHACRYLONITRILE
Nicola Giordano, Enrico Cavaterra, and Vittorio Fattore, Milan, Italy, assignors to Montecatini Edison S.p.A., Milan, Italy
No Drawing. Filed Dec. 19, 1966, Ser. No. 602,500
Claims priority, application Italy, Dec. 24, 1965, 15,693/65; July 7, 1966, 28,595/65
Int. Cl. C07c *121/04;* B01j *11/06*
U.S. Cl. 260—465.3                                3 Claims

ABSTRACT OF THE DISCLOSURE

A catalytic system for the preparation of unsaturated nitriles by reacting at elevated temperatures and in gaseous phase olefins, oxygen and ammonia in the presence thereof, the said catalytic system being a known catalyst supported on a carrier of preformed silica having a mean pore diameter of from between about 40 A. and 200 A. Also, the process for the preparation of unsaturated nitriles employing the aforesaid catalytic system.

BACKGROUND OF THE INVENTION

The present invention relates to catalysts and to catalytic processes for the preparation of unsaturated nitriles in gaseous phase from olefines, ammonia and oxygen.

Many processes by which unsaturated nitriles are produced in gaseous phase are already known in the art: for example, the production of acrylonitrile or methacrylonitrile by employing respectively propylene and isobutene, ammonia, air or oxygen and, occasionally steam.

The reaction is carried out in gaseous phase, at a temperature ranging from 350 to 550° C. and at atmospheric pressure or at superatmospheric pressure.

Generally these processes are carried out by means of catalysts containing one or more of the following elements: bismuth, tin, antimony, molybdenum, phosphorus, tungsten, cobalt, tellurium, chromium, arsenic, vanadium, manganese, copper, iron, cerium, etc.

These elements, in the form of their oxides, salts or compounds having a different formation, are generally supported on suitable materials such as, for example, various qualities of silicon dioxide, alumina, fireclay, etc.

Among the various elements affecting the yield and the selectivity of the reaction, considerable importance must be attributed to the type of catalyst and to its carrier.

As regards the carrier, the method of preparation and the characteristics thereof remarkably affect the activity of the catalyst and its life: a suitable choice of these characteristics permits one to carry out the reaction under more favorable operating conditions.

From the technical literature it appears that the most utilized carriers are those obtained from silica sol and from silica aerogel.

These carriers give rise to methods of preparation of the catalysts which are generally quite complicated.

For example, in the case of silica sol, normal drying of the mixture with the active component affords a mass which must be further treated in a burdensome way (crushing, grinding, pressing into tablets, extrusion) to obtain the catalyst in a form suitable for use in fixed bed; in the case of the use of the catalyst in fluid bed, the mixture is generally subjected to "spray-drying" to obtain microspheroidal particles.

When aerogel is used there is required a preparation for admixture with the active component of the catalyst followed by operations of extrusion, pressing into tablets, granulating, etc.

In every case catalysts are obtained which not always exhibit the characteristics of mechanical resistance particularly necessary for use in fluid bed.

Therefore, an object of the persent invention is that of providing a catalyst via the direct impregnation of the carrier with one or more solutions of active components by a quite simple and readily performed process of preparation.

Another object of the present invention is that of preparing a microspheroidal catalyst, having a considerably enhanced hardness and which is particularly suitable for reactions in fluid bed.

Still another object of the present invention is that of preparing a catalyst particularly suitable for the reaction of olefins, ammonia and oxygen for the synthesis of unsaturated nitriles, which permits of high conversions or selectivity.

THE INVENTION

According to the present invention, it has surprisingly been found that excellent catalysts are obtained for the synthesis of unsaturated nitriles when there are used as carriers preformed silica characterized by a mean pore diameter ranging from between about 40 A. to 200 A.

Particularly suitable is silica with a mean pore diameter ranging from between about 50 A. to 150 A.

As it is known to the skilled artisan the mean pore diameter in A. is defined by the ratio $$A. = \frac{4Vg}{Sg} 10^8$$

where $Vg$ is the total volume of the pores in cm.$^3$/g. and $Sg$ is the surface area in cm.$^2$/g.

Values of mean pore diameter within the above-mentioned range can result from diverse combinations of the values of the pore volume and of the surface area.

Particularly suitable carriers according to the present invention are those carriers consisting of silica having a mean pore diameter in the range of from 50 to 150 A. and having a surface area in the range of from 250 to 700 m.$^2$/g.

Silica carriers having the above-mentioned characteristics and microspheroidal form have been found to be particularly suitable for the preparation of catalysts to be used in fluid beds.

Catalysts with different active elements, prepared by using as a carrier silica having the characteristics of mean pore diameter in the above-mentioned range, and used in the synthesis of unsaturated nitriles from olefins, ammonia and oxygen, display excellent selectivities for the unsaturated nitrile desired.

Furthermore, the same carriers, characterized by surface areas in the above-mentioned range, afford catalysts also provided with a high specific activity (in terms of conversion of the olefin).

On the contrary, catalysts prepared from carriers characterized by a mean pore diameter smaller than the minimum reported value, exhibited low values of selectivity in regards the unsaturated nitrile, but affording on the other hand very high quantities of products of total oxidation.

In order to further illustrate the present invention and the advantages thereof, the following specific examples are given, it being understood that the same are merely intended to be illustrative and not limitative.

Example 1

Catalysts having the following chemical composition $Bi_2O_3$ 18%, $CeO_2$ 1.45%, $MoO_3$ 14.8% and $SiO_2$ 65.8% were prepared in the following manner:

18 g. of $(NH_4)_6Mo_7O_{24}.4H_2O$ were dissolved in 8.5 cc. of $H_2O$ and 8.5 cc. of $H_2O_2$ 35% (120 vol.). A solution was separately prepared by dissolving 37.3 g. of $Bi(NO_3)_3.5H_2O$ and 3.7 g. of $Ce(NO_3)_3.6H_2O$ in 8.50 cc. of $HNO_3$ at 65% and 15.0 cc. of $H_2O$. The molybdic solution was then poured slowly into the solution containing cerium and bismuth.

The resulting solution was diluted with $HNO_3$ until it had a volume equal to the total volume of the pores of the carrier. 65.8 g. of the selected carrier were impregnated with this solution.

The product obtained was dried for 12 hours at 110° C., then it was activated for 8 hours at 550° C. in air.

5 catalysts (A, B, C, D, E) were prepared by using from time to time carriers with different characteristics as indicated in Table 1. With each one of these catalysts the synthesis of acrylonitrile was carried out according to the following procedure:

4.5 cc. of the catalyst were placed into a stainless steel reactor thermoregulated at 430° C.

A mixture of propylene, ammonia and air was passed over the catalyst at atmospheric pressure in the molar ratios 1:1:10 in such quantity as to afford a contact time of 2.5 seconds calculated at temperature and pressure reaction conditions.

The reaction products were analyzed via gas chromatography.

The conversion data of propylene and of selectivity in acrylonitrile and in carbon oxides are reported in Table I.

TABLE I

| Carrier | | Propylene conversion | Selectivity | |
|---|---|---|---|---|
| Sg m.²/g. | d A. | | Acrylo-nitrile | CO+CO₂ |
| Catalyst: | | | | |
| A | 150 | 230 | 37.4 | 61.7 | 24.4 |
| B | 412 | 114 | 95.6 | 85.6 | 10.7 |
| C | 600 | 66 | 79.1 | 78.3 | 10.5 |
| D | 926 | 32 | 91.8 | 66.7 | 24.8 |
| E | 600–800 | 20 | 23.9 | 60.8 | 31.0 |

Example 2

Catalyst having the following chemical composition $TeO_2$ 1.4%, $CeO_2$ 7.8%, $MoO_3$ 15.9%, $SiO_2$ 75.6% were prepared in the following manner:

19.2 g. of $(NH_4)_6Mo_7O_{24}.4H_2O$ were dissolved in 6.5 cc. of water and 6.5 cc. of $H_2O_2$ at 35% (120 vol.). Another solution was separately prepared by dissolving 2.1 g. of $H_2TeO_4.2H_2O$ and 19.7 g. of $Ce(NO_3)_3.6H_2O$ in 25 cc. of water and 9.6 g. of $HNO_3$ at 65%.

The molybdic solution was then slowly poured into the solution containing tellurium and cerium.

The resulting solution was diluted with water until it had a volume equal to the total volume of the pores of the carrier and 75.6 g. of the selected carrier were impregnated therewith.

7 catalysts (F, G, H, I, L, M, N) were prepared differing thereamongst in the characteristics of the carrier which was constituted from time to time by silica characterized by different values of medium pore diameter as indicated in Table II.

A synthesis of acrylonitrile was carried out with each one of these catalysts following the procedure described in Example 1.

The data are reported in Table II.

TABLE II

| Carrier | | Propylene conversion | Selectivity | |
|---|---|---|---|---|
| Sg m.²/g. | d A. | | Acrylo-nitrile | CO-CO₂ |
| Catalyst: | | | | |
| F | 350 | 206 | 94.8 | 75.0 | 17.6 |
| G | 322 | 114 | 98.9 | 81.3 | 12.5 |
| H | 411 | 114 | 97.8 | 80.7 | 11.7 |
| I | 350 | 82 | 97.5 | 81.0 | 13.5 |
| L | 600 | 66 | 91.3 | 70.0 | 17.0 |
| M | 677 | 62 | 98.0 | 78.0 | 14.8 |
| N | 926 | 32 | 57.0 | 20.2 | 52.4 |

In order to illustrate the invention, known catalysts of the technical literature were prepared on silica carriers having different characteristics.

In the present patent application the hereinunder reported terms have the following meaning:

Percent conversion of the olefin:

$$\frac{\text{mole of reacted olefin}}{\text{mole of fed olefin}} \times 100$$

Net yield or selectivity equal percent of the yield of product X with respect to the converted olefin equal $$\frac{\text{carbon weight in product X}}{\text{carbon weight in the converted olefin}} \times 100$$

Contact time.—The time during which one unit volume of the fed gaseous mixture, measured under the mean temperature and pressure conditions existing in the reactor, comes into contact with the unit of apparent volume of the catalyst.

Example 3

Preparation of the catalyst 1–15.—Some catalysts (from 1 to 3) consisting of the phosphomolybdate of bismuth supported on microspheroidal silica having a surface area 398 m.²/g.; total volume of pores 1.18 cm.³/g.; medium diameter of pores 119 A., were prepared according to the following method (see Table A) $a$ g. of ammonium paramolybdate $(NH_4)_6Mo_7O_{24}.4H_2O$ and $b$ g. of monoammonium phosphate $NH_4H_2PO_4$ were dissolved in $c$ cc. of water and $c$ cc. of hydrogen dioxide at 120 volumes. The solution obtained was poured slowly and under stirring into a solution of $d$ g. of the nitrate of bismuth $Bi(NO_3)_3.5H_2O$ in $e$ cc. of water and $f$ g. of $HNO_3$ at 65% by weight. The resulting mixture was diluted with nitric acid 1:5 up to a total volume of $g$ cc.; $h$ g. of microspheroidal silica were then impregnated with the resulting solution. The resulting mass was dried at 110° C. for 10–12 hours and activated by heating at 540° C. for 8 hours in the presence of air.

TABLE A

| | Cat. 1 | Cat. 2 | Cat. 3 |
|---|---|---|---|
| References: | | | |
| a | 27 | 27 | 36 |
| b | 1.45 | 1.45 | 1.94 |
| c | 13.5 | 13.5 | 18 |
| d | 55.5 | 55.5 | 74 |
| e | 30 | 30 | 40 |
| f | 12.7 | 12.7 | 17 |
| g | 228 | 170 | 216 |
| h | 206 | 154.1 | 196.2 |
| Percent of active part in the catalyst | 20 | 25 | 35 |

In order to make a comparison the catalyst from 4 to 6 were prepared consisting of the phosphomolybdate of bismuth starting from a commercial silica sol.

The following method of preparation was used (see Table B):

$a$ g. of ammonium paramolybdate $$(NH_4)_6Mo_7O_{24} \cdot 4H_2O$$

and $b$ g. of monoammonium phosphate $NH_4H_2PO_4$ were dissolved in $c$ cc. of water and $c$ cc. of hydrogen dioxide at 120 vol. $d$ g. of silica sol at 30% (Ludox HS) were acidified quickly with $e$ g. of $HNO_3$ at 65% by weight and in this solution $f$ g. of $Bi(NO_3)_3 \cdot 5H_2O$ were dissolved.

The first solution was added slowly and under stirring to the second solution and the mixture was taken down to dryness, dried at 110° C. for 10–12 hours and the mass obtained was activated at 540° C. for 8 hours in the presence of air.

TABLE B

|  | Cat. 4 | Cat. 5 | Cat. 6 |
|---|---|---|---|
| References: |  |  |  |
| a | 27 | 27 | 36 |
| b | 1.45 | 1.45 | 1.94 |
| c | 13.50 | 13.50 | 18 |
| d | 660 | 494 | 408 |
| e | 70 | 60 | 50 |
| f | 55.50 | 55.50 | 74 |
| Percent of active part into the catalyst | 20 | 25 | 35 |

The catalyst from 7 to 9, containing cerium and antimonium, were prepared by using the following method of preparation (see Table C):

$a$ g. of antimony salt and $b$ g. of cerium chloride ($CeCl_3 \cdot 7H_2O$) were dissolved into $c$ cc. of hydrochloric acid concentrated at 35% and from time to time the solution was diluted with hydrochloric acid at 10% up to a total volume of $d$ cc.

With the solution thus obtained $e$ g. of commercial microspheroidal silica were impregnated having the characteristics reported in the description of catalyst 1 and the impregnated mass was dried. The product obtained was treated with water and ammonia up to an alkaline reaction, washed thoroughly and dried again at 110° C. and activated via calcination in air at $f$ ° C. for 8 hours and at 760° C. for 12 hours.

TABLE C

|  | Cat. 7 | Cat. 8 | Cat. 9 |
|---|---|---|---|
| References: |  |  |  |
| a $SbCl_3$ | 22.8 |  |  |
| $SbCl_2$ |  | 29.9 | 34.2 |
| b | 10.8 | 10.8 | 5.58 |
| c | 5 | 10 | 10 |
| d | 30 | 43 | 31 |
| e | 25.4 | 31.2 | 24.7 |
| f | 650 | 650 | 425 |
| Percent of active part into the catalyst | 44.4 | 44.4 | 50 |

The catalysts 10 and 11 containing antimony and iron, were prepared according to the following method (see Table D): $a$ g. of microspheroidal silica having the above cited characteristics were impregnated with a solution obtained by dissolving $b$ g. of $SbCl_3$ and $c$ g. of $$FeCl_3 \cdot 6H_2O$$

in $d$ cc. of HCl concentrated at 35% and $e$ cc. of water. The product obtained was suspended under stirring into a solution obtained by adding $f$ cc. of water to $g$ cc. of concentrated ammonia.

The mixture was filtered and dried at 100° C. for 24 hours and then it was activated through subsequent heating at 650° C. for 16 hours, at 750° C. for 16 hours and at 850° C. for 24 hours.

TABLE D

|  | Cat. 10 | Cat. 11 |
|---|---|---|
| References: |  |  |
| a | 27 | 54 |
| b | 34.2 | 34.2 |
| c | 13.5 | 13.5 |
| d | 10 | 10 |
| e |  | 45 |
| f | 310 | 310 |
| g | 50 | 54 |
| Percent of active part into the catalyst | 50 | 25 |

Catalyst 12 containing antimony and uranium was prepared according to the following method:

50 g. of $SbCl_5$ and 10.2 g. of uranyl acetate $$(UO_2(C_2H_3O_2)_2 \cdot 2H_2O)$$

were dissolved in 10 cc. of hydrochloric acid concentrated at 35% and 10 cc. of water.

35.5 g. of microspheroidal silica of the above-mentioned type were impregnated with this solution and the mass thus obtained was dried at a moderate temperature.

The obtained product was treated with a diluted solution of ammonia until alkaline, filtered and washed thoroughly with water, dried at 100° C. and activated through heating at 425° C. for 12 hours and at 760° C. for 12 hours.

Catalysts 13, 14, 15, containing antimony, uranium, cerium and molybdenum were obtained according to the following method (see Table E).

To $a$ g. of $SbCl_5$ there were added sequentially $b$ cc. of hydrochloric acid concentrated at 35%, $c$ cc. of water, $d$ g. of $UO_2(NO_3)_2 6H_2O$ and $e$ g. of $CeCl_3 7H_2O$.

A solution of $f$ g. of $(NH_4)_6Mo_7O_{24} \cdot 4H_2O$ in $g$ cc. of water and $g$ cc. of hydrogen dioxide at 120 volumes was poured in the solution above described.

$h$ g. of microspheroidal silica of the above-cited type were impregnated with the resulting solution.

The mass obtained was dried at moderate temperature and subsequently treated with a diluted solution of ammonia to pH 8, filtered and washed throughly with water, dried at 110° C. and activated through heating at 425° C. for 12 hours and at 600° C. for 12 hours.

TABLE E

|  | Cat. 13 | Cat. 14 | Cat. 15 |
|---|---|---|---|
| References: |  |  |  |
| a | 210 | 210 | 210 |
| b | 50 | 50 | 50 |
| c | 30 | 30 | 30 |
| d | 58.8 | 58.8 | 58.8 |
| e | 13.5 | 24 | 24 |
| f | 9.7 | 4.58 | 2.29 |
| g | 10 | 10 | 10 |
| h | 161 | 162 | 160 |
| Percent of active part into the catalyst | 50 | 50 | 50 |

Examination of catalysts 1–15.—Catalysts 1–15 were used for the preparation of acrylonitrile. The conditions under which the test was carried out were as follows:

4.5 cc. of the catalyst were placed in a microreactor operating in fixed bed constituted essentially by a stainless steel tube provided with an inlet tube of the reacting substances and with an outlet tube for the reaction gaseous mixture, provided with a thermocouple for controlling the temperature of the catalytic bed and with a heating thermoregulating system.

At atmospheric pressure, a gaseous mixture of propylene, ammonia and air was fed to the reactor in the molar ratio indicated in the hereinunder reported table and with a contact time (measured under the pressure and temperature conditions existing in the catalytic bed) of 2.5 seconds.

The reaction products were analyzed directly through gas-chromatography.

The following Table III reports the reaction conditions and the obtained results.

TABLE III

| Cat. No. | Conditions of the test | | | | Percent propylene conversion | Net yield percent | | | | Gross yield acrylonitrile |
|---|---|---|---|---|---|---|---|---|---|---|
| | Air/C₃ | NH₃/C₃ | T./sec. | T., °C. | | Acrylonitrile | Acetonitrile | Acrolein | CO+CO₂ | |
| 1 | 10 | 1 | 2.5 | 400 | 70.6 | 62.3 | 24.9 | | 12.7 | 44 |
| 1 | 10 | 1 | 2.5 | 440 | 91.1 | 67.8 | 15 | 2.4 | 14.7 | 61.7 |
| 1 | 10 | 1 | 2.5 | 470 | 95.2 | 65.7 | 14.8 | 0.9 | 18.6 | 62.5 |
| 2 | 10 | 1 | 2.5 | 400 | 76.8 | 65.2 | 22.8 | | 12 | 50 |
| 2 | 10 | 1 | 2.5 | 440 | 96.1 | 66.4 | 14.1 | 1 | 18.4 | 63.8 |
| 2 | 10 | 1 | 2.5 | 470 | 96.8 | 70.3 | 11.7 | 1.5 | 16.4 | 68.1 |
| 3 | 10 | 1 | 2.5 | 400 | 96.2 | 63.5 | 20.4 | | 16.2 | 54.7 |
| 3 | 10 | 1 | 2.5 | 440 | 96.5 | 68.2 | 16 | tr. | 15.8 | 65.8 |
| 3 | 10 | 1 | 2.5 | 470 | 97 | 68.9 | 13.1 | | 17.1 | 66.9 |
| 4 | 10 | 1 | 2.5 | 400 | 28.5 | 62.3 | 15.6 | | 20.1 | 17.7 |
| 4 | 10 | 1 | 2.5 | 440 | 49.1 | 62.6 | 13.4 | | 24.4 | 30.7 |
| 4 | 10 | 1 | 2.5 | 470 | 63 | 58.1 | 9.8 | 4.5 | 27.6 | 36.6 |
| 5 | 10 | 1 | 2.5 | 400 | 46.9 | 53.7 | 16.1 | | 30.2 | 25.2 |
| 5 | 10 | 1 | 2.5 | 440 | 60.3 | 58.2 | 13.5 | 1.7 | 26.6 | 35.1 |
| 5 | 10 | 1 | 2.5 | 470 | 72 | 55.2 | 11.9 | 6.9 | 25.9 | 39.8 |
| 6 | 10 | 1 | 2.5 | 400 | 44 | 63 | 20.5 | 1 | 15.5 | 27.7 |
| 6 | 10 | 1 | 2.5 | 440 | 75.4 | 59.2 | 11.4 | 15 | 14.4 | 44.6 |
| 6 | 10 | 1.3 | 2.5 | 470 | 91.9 | 62.9 | 7.9 | 16 | 31.2 | 57.8 |
| 7 | 10 | 1 | 2.5 | 440 | 54 | 63.1 | 6.6 | | 30.2 | 34.1 |
| 7 | 10 | 1 | 2.5 | 480 | 71.8 | 57.8 | 8.9 | | 34.3 | 41.5 |
| 8 | 10 | 1 | 2.5 | 470 | 60.2 | 69.8 | 4.9 | | 25.3 | 42 |
| 8 | 10 | 1 | 2.5 | 490 | 68.5 | 69.5 | 4.3 | | 26.2 | 47.6 |
| 8 | 10 | 1 | 2.5 | 510 | 63.5 | 60.2 | 4.4 | | 33.5 | 38.2 |
| 9 | 10 | 1 | 2.5 | 470 | 44.4 | 70.3 | 2 | 2.5 | 25.2 | 31.3 |
| 9 | 10 | 1 | 2.5 | 480 | 44.1 | 70.1 | 1.8 | 2.2 | 25.9 | 31.6 |
| 10 | 10 | 1 | 2.5 | 440 | 52.6 | 74.7 | 7.9 | | 17.4 | 39.5 |
| 10 | 10 | 1 | 2.5 | 480 | 74.7 | 65.5 | 7 | | 27.5 | 48.9 |
| 11 | 10 | 1 | 2.5 | 440 | 43.5 | 76.3 | 9.8 | | 13.9 | 33.2 |
| 11 | 10 | 1 | 2.5 | 480 | 62.8 | 69.4 | 6.7 | | 23.8 | 43.6 |
| 12 | 10 | 1 | 2.5 | 470 | 49.1 | 76.8 | 6.3 | 2.5 | 14.4 | 37.8 |
| 12 | 10 | 1 | 2.5 | 460 | 47.9 | 76.7 | 5.4 | 2.4 | 15.3 | 36.8 |
| 12 | 10 | 1 | 5 | 470 | 56.4 | 71.7 | 6.1 | 1.7 | 20.5 | 40.5 |
| 12 | 10 | 1 | 5 | 480 | 63.7 | 71.7 | 5.3 | 1.8 | 21.1 | 45.7 |
| 13 | 10 | 1.34 | 2.5 | 490 | 60.0 | 75.3 | 2.4 | | 22.3 | 45.1 |
| 14 | 10 | 1.34 | 2.5 | 480 | 53.2 | 76 | 1.5 | | 22.4 | 40.5 |
| 15 | 10 | 1.34 | 2.5 | 480 | 55.0 | 77 | 2 | | 21 | 42.4 |

As many apparently widely different embodiments of the present invention can be made without departing from the spirit and scope thereof, it is to be understood that the same is not intended to be limited to the said specific embodiments.

What is claimed is:

1. In a process for the preparation of acrylonitrile or methacrylonitrile by reacting at a temperature of about 350 to 550° C. and in gaseous phase an olefin selected from the group consisting of propylene and isobutylene, respectively, oxygen and ammonia in the presence of a catalyst, the improvement comprising the said catalyst being supported on a carrier of microspheroidal preformed silica having an average pore diameter between about 40 A. and 200 A. and a surface area in the range between about 250 and 700 m.²/g.

2. In a process as defined by claim 1 wherein the microspheroidal preformed silica has an average pore diameter between about 50 A. and 150 A.

3. The process as defined by claim 1 wherein the reaction is conducted in a fluid bed.

References Cited

UNITED STATES PATENTS

| 3,226,421 | 12/1965 | Giordano et al. | 260—465.3 |
| 3,231,600 | 1/1966 | Jones et al. | 260—465 |
| 3,243,385 | 3/1966 | Sennewald et al. | 260—465.3 XR |
| 3,256,311 | 6/1966 | Becke et al. | 260—465.2 XR |
| 3,278,573 | 10/1966 | Kroeper et al. | 260—465 |
| 3,347,899 | 10/1967 | Caporali et al. | 260—465.3 |
| 3,370,083 | 2/1968 | Ferlazzo et al. | 260—465.3 |

FOREIGN PATENTS 1,288,403  2/1962  France.

JOSEPH P. BRUST, Primary Examiner

U.S. Cl. X.R.

252—454, 455, 456, 457, 458, 459; 260—604